United States Patent [19]
Gotoh et al.

[11] 3,773,638

[45] Nov. 20, 1973

[54] PROCESS FOR THE RADIATION CURING OF UNSATURATED POLYESTER RESINS IN THE PRESENCE OF SULFUR-VULCANIZED ELASTOMER

[75] Inventors: Kazuo Gotoh; Kunio Araki; Takashi Sasaki, all of Takasaki, Japan

[73] Assignee: Japan Atomic Energy Research Institute, Tokyo, Japan

[22] Filed: June 15, 1971

[21] Appl. No.: 153,397

[30] Foreign Application Priority Data
June 18, 1970 Japan.............................. 45/53095

[52] U.S. Cl.......... 204/159.19, 117/93.31, 117/148, 156/272, 204/159.14, 204/159.15, 204/159.2, 260/3, 260/40 R, 260/862, 260/873, 264/22
[51] Int. Cl.......... B01j 1/10, C08d 1/00, C08f 1/16
[58] Field of Search.................. 204/159.14, 159.15; 264/25, 26; 117/93.31, 139

[56] References Cited
UNITED STATES PATENTS

| | | | |
|---|---|---|---|
| 3,247,012 | 4/1966 | Burlant.............................. | 117/139 |
| 3,661,614 | 5/1972 | Bassemir et al................ | 204/159.23 |

*Primary Examiner*—Murray Tillman
*Assistant Examiner*—Richard B. Turer
*Attorney*—David Toren et al.

[57] ABSTRACT

This invention relates to a method of curing unsaturated polyester resins in contact with elastomers by polymerization employing ionizing radiation.

This invention, which overcomes all drawbacks in the prior art whereby unsaturated polyester resins under the afore-mentioned condition could not be cured, only remaining in gel form, can be widely used for various kinds of fiber glass reinforced plastics and coated goods including decorative laminates and the like.

6 Claims, No Drawings

PROCESS FOR THE RADIATION CURING OF UNSATURATED POLYESTER RESINS IN THE PRESENCE OF SULFUR-VULCANIZED ELASTOMER

BACKGROUND OF THE INVENTION

This invention relates to a method of curing unsaturated polyester resins, in particular unsaturated polyester resins in direct contact with a surface film or molding of sulfur vulcanized natural or synthetic rubber. The unsaturated polyester resins are being used very commonly and extensively as resins for FRP (fiberglass reinforced plastics), decorative laminates, and coatings, and a number of methods of curing these resins are already known. In general, methods are being used for curing by heating in the presence of a catalyst added as a polymerization initiator or curing after a certain induction time at ambient temperture with the additional use of polymerization accelerators.

However, it is known that processes wherein FRP molding materials using an unsaturated polyester resin are pressed against vulcanized rubber as in the pressure bag, the vacuum bag, the autoclave or the plunger molding method (Ref. Modern Plastics Encyclopedia Vol. 40, No. 1A, page 666, September 1962), those wherein the molding materials or unsaturated polyester resin coatings are cured over a vulcanized rubber bag or sheet, and those in which the afore-mentioned molding materials or unsaturated polyester resin coated or impregnated materials are cured covered with a vulcanized rubber tube, bag or spirally wound narrow belt-like sheet are invariably accompanied by a shortcoming in that if the unsaturated polyester resin is placed in direct contact with the natural or synthetic rubber vulcanized with sulfur, the portion of the unsaturated polyester resin at the contact area remains in a viscous liquid or a tacky gel form even when the remaining portion has been polymerized and cured.

The reasons for the occurrence of this phenomenon are considered to be (1) that a chain transfer reaction or inhibtion reaction which takes place due to the disulfide linkage ( —S—S— bond), mercaptan or some other substance in the vulcanized rubber coming in contact with monomers in the resin inhibits the curing reaction of the resin which involves polymerization as a main object and (2) that the curing reaction of the resin is virtually checked by the degradative chain transfer reaction in which allyl type (—CH—CH= CH—) radicals are formed as a result of hydrogen atoms adjacent to the double bonds being dislodged when the double bonds having methylene groups, which generally are contained in synthetic rubber in large numbers, come in contact with the resin or monomers in the FRP undergoing the polymerization.

For this reason, when previously FRP goods were manufactured using unsaturated polyester resins or when these resins were applied as coatings, it has been usual either that no elastomers are used for the molding sheet or base material, or that if an elastomer must be used, special care is taken as it is necessary to insert an inert material which does not interfere with the curing of the resins, such as polyvinyl alcohol films and paraffin, at the boundary of contact between the elastomer and resin. However, the latter method has the disadvantage that there is a possiblity of causing cracks or wrinkles to the inert material when the elastomer is expanded over intricately irregular surfaces and thus bringing about increased cost.

Furthermore, when unsaturated polyester resins are cured with paraffin which is used so as to keep the resin out of direct contact with the elastomer in the presence of a thermally decomposed type of catalyst which liberates heat, it is often the case that rejects arise among the products due to the paraffin fusing into the unsaturated polyester resin.

Moreover, in processing unsaturated polyester resins by the matched-die molding method, a method might be used which is so designed as to adjust the pressure between the mold, male or female, and the laminate layer to make the thicknesses of the ultimately molded objects uniform. This is done by placing the molding material which is pre-impregnated with an unsaturated resin in the mold, male or female, and further placing over it an elastic layer which is only minimally subject to cold flow because of its ease of expansion or contraction. A vulcanized rubber product capable of expansion and contraction was used in the various types of mold frames for this purpose, very desirable results might be expected with regard to the rate of cure, aging, and product properties since the strains caused by the contraction of its volume which takes place when the resin cured, would be absorbed by the rubber layer so that no special techniques might be required in the operation of the press. However, for the reasons described hereinabove, matched-die molding of unsaturated polyester resins which could use an elastomer have been employed because of the foregoing described limitations.

STATEMENT OF THE INVENTION

The first object of this invention is to remedy the drawbacks which have heretofore existed as described in the foregoing and provide a novel and improved and more facile method of curing unsaturated polyester resins. The second object of this invention is to produce unsaturated polyester resin FRP goods using an elastomer as a mold or base.

The present invention consists of a method of curing which comprises subjecting the unsaturated polyester resins to ionizing radiation. The inventors have ascertained, after having studied various methods of curing unsaturated polyester resins in contact with elastomers, that it is possible to completely cure unsaturated polyester resins, not excepting the portions thereof in contact with sulfur vulcanized elastomers, by using ionizing radiation without resorting to any of the methods known in the prior art.

The unsaturated polyester resins described as the subject matter of this invention may be any of those already known. In particular, reaction products of unsaturated dibasic acids or acid anhydrides, such as, maleic acid or maleic anhydride, fumaric acid, itaconic acid or itaconic anhydride and citraconic acid or citraconic anhydride, and dihydric or other polyhydric alcohols, or partly modifying the aforementioned acids with aliphatic, aromatic or alicyclic carboxylic acids having a carboxylic group or their halogen derivatives, and the solutions obtained by dissolving them in one or more types of polymerizable monomers, such as styrene, vinyl acetate, vinyl toluene, chlorostyrene, divinylbenzene, methacrylates, acrylates, acrylonitrile, methacrylonitrile, diacrylphthalate, triacrylcyanurate, and so forth are considered suitable. (Ref. S. OLEESKY, G.

MOHR, Handbook of Reinforced Plastics — 1964) Various kinds of pigments, dyes and fillers may also be added to them.

These unsaturated polyesters in general are 1,000 – 4,000 in molecular weight. Since resins have many sorts of different properties dependent on the combination and amounts of unsaturated acids, saturated acids, or glycols, used as the main constituents, and the monomers serving as solvents, of which there are a great number of varieties, they should be used selectively, taking into account their properties and performance which are distinctively suited for specific applications.

The ionizing radiation applicable in accordance with this invention is ionizing radiation or accelerated particle radiation from any source, exemplified by $\beta$-rays, $\gamma$-rays, an accelerated electron beam, X-rays, neutron beam and so forth.

The dose rates of the ionizing radiation in accordance with this invention are $10^3 - 10^{11}$ rad/hr. and more desirably $5 \times 10^5 - 10^{10}$ rad/hr., and the curing temperatures are $-40° - +120°C$ and, more desirably, in the range of $0° - 50°C$. The processing pressure may be around atmospheric, but it should necessarily be maintained at $0.5 - 2$ kg/cm$^2$G when the pressure bag or autoclave process is used and at $100 - 700$ mmHg in the case of the vacuum bag process. Nevertheless, in any case, the processing temperatures and pressures may be the same as those used when all the respective unsaturated polyester resins so far known are cured. The dose rate may suitably be determined dependent on the type of resin, its amount, the hardness required of the end product, the curing time used and so forth.

The elastomers may be a sulfur-vulcanized rubber selected optionally from natural rubber, butadiene-styrene rubber, butyl rubber, nitrile rubber, chloroprene rubber, polybutadiene rubber, isoprene rubber, ethylene-propylene terpolymer and the like.

According to this invention it is possible to easily yet completely cure unsaturated polyester resins in contact with an elastomer without any of the difficulties previously encountered. Consequently, there is derived therefrom the advantage that male and female molds, molding rod, rubber molding belts, compressible sheets and the like which could not be used previously in the manufacture of various FRP articles or resin coated articles and the bonding of them can be used as desired. The advantages offered by this invention will be further described hereinbelow.

1. Hollow objects can be obtained by lamination by coating unsaturated polyester resin molding materials over the base consisting of a hollow body made of vulcanized rubber, curing the resin by applying ionizing radiation and subsequently removing the hollow body after contracting it.

2. Molded goods resembling molded objects made by the matched-die molding process can be obtained by pouring molding materials similar to those aforementioned into female molds made of metal, plastics, gypsum, concrete, wood or the like, and then introducing compressed air into a bag of vulcanized rubber placed over them, curing the molding materials by subjecting them to ionizing radiation while they are being pressed by the rubber bag against the mold and subsequently removing the rubber bag after contracting same.

3. Molded goods resembling those made by the matched-die molding method can be obtained by depositing molding materials on male molds made of any of the same materials mentioned in the foregoing, covering their upper side or periphery with vulcanized rubber, curing the molding materials by ionizing radiation applied while keeping the space between the rubber bag or rubber and the mold under vacuum and applying atmospheric pressure (external pressure) to the molding materials, and subsequently removing the rubber.

4. After placing plywood panels, metal plates, wood pieces coated or impregnated with an unsaturated polyester resin or other impregnated or coated materials on a conveyor belt made of vulcanized rubber, the resin is cured by applying ionizing radiation, impregnated or coated objects which are cured flatly and smoothly at the areas in contact with the rubber can be obtained.

5. Molded objects having a beautiful surface and appearance can be obtained successively or intermittently by curing unsaturated polyester resin coated or impregnated articles in shape of rod, hollow body or profile form, which are covered by a vulcanized rubber tube, bag or spirally wound belt, or molding materials by applying ionizing radiation successively or intermittently and removing the rubber cover.

6. Since the vulcanized rubber contracts simultaneously with the contraction of the cured unsaturated polyester resins, a flat, smooth surface can be obtained.

7. Dimensionally accurate molded objects can be obtained by curing unsaturated polyester resins while expanding a rubber belt in a lateral direction.

8. Dimensionally accurate and V-shaped objects can be obtained, for example, by changing the rubber belt into a V-shape in a semi-cured condition and subsequently curing them completely. In contrast, if paraffin or the like is used between the vulcanized rubber and unsaturated polyester resin as the aforesaid process, desired objects cannot be obtained due to both materials losing adhesion or uncured areas arising due to cracks in the paraffin, for example.

Typical examples of the method of the present invention will be given hereinafter but should not be construed as limiting the scope of this invention. All the parts indicated in the Examples represent parts by weight.

EXAMPLE 1

A commercial unsaturated polyester resin which consists of poly(propylene maleate phthalate) with an addition of styrene at approximately 33 percent of the total amount of the former was applied in a thickness of approximately 1mm directly on to a 1mm thick sulfur vulcanized natural rubber sheet containing carbon black. The other side of the resin was covered with cellophane to shut it off from the air. When 10 M rad electron beam was subsequently applied at 1mA, at atmospheric pressure and ambient temperature, the resin was cured rapidly, easily and completely. Moreover, the cured resin could be released cleanly from the surfaces of both the cellophane and rubber. The surface hardness of both sides as measured by the Barcol tester reached 80 – 90.

In comparison, in the case of a method in which 1.0 part of methyl ethyl ketone peroxide and 0.5 part of cobalt naphthenate were added as a catalyst and a cocatalyst respectively to the above-mentioned unsaturated polyester resin, which was covered with cellophane on the upperside, while the underside being in direct contact with the sulfur vulcanized natural rubber, the one side of resin covered with the cellophane was completely cured after the lapse of two hours at ambient temperature but even after subsequently heated for additional two hours at 100°C, the side in contact with the rubber was not cured, remaining in a viscous liquid form.

EXAMPLE 2

An approximately 1mm thick fiber glass reinforced plastics sheet molding material pre-impregnated with a commercial unsaturated polyester resin which is composed of poly(diethylene glycol maleate isophthalate) with approximately 30 percent of styrene and 3 percent of methyl methacrylate added was placed in a female mold made of gypsum. The molding material, pressed against the mold with a 0.5mm thick sulfur-vulcanized SBR pressure bag into which 2 kg/cm$^2$G compressed air was passed, was cured after 10 hours' irradiation with $60_{Co}$ γ-rays at a dose rate of $10^5$ rad/hr. Subsequently the rubber bag was removed and a good quality FRP molded article was obtained.

EXAMPLE 3

A plywood panel with a wood pattern printed sheet overlaid was coated, at a thickness of 200μ, with an unsaturated polyester resin consisting of poly(ethylene propylene fumarate tetrachlorophthalate) to which approximately 20 percent of styrene and approximately 10 percent of vinyl acetate monomers were added, and was placed so as to have its resin coated surface contact with a 0.5mm thick sulfur vulcanized NBR (nitrile rubber) conveyor. Radiation was then applied through the rubber conveyor using a 1 MeV electron beam accelerator at a dose rate of $8 \times 10^6$ rad/sec. for 2 seconds. After removal form the rubber surface, a matted decorative panel having a high surface hardness was obtained.

EXAMPLE 4

A molding material consisting of 100 parts of an unsaturated polyester resin comprised of poly(propylene glyceryl fumarate adipate) to which approximately 20 percent of styrene, approximately 10 percent of methyl methacrylate and approximately 3 percent of acrylonitrile were added, combined with 15 parts of chopped glass fiber and 30 parts of silica powder, was poured into a female mold made of sulfur vulcanized ethylene-propylene terpolymer rubber. The resin was cured by subjecting it to 30 hours' irradiation using a $137_{Cs}$ γ-ray source at a dose rate of $10^4$ rad/hr. When it was subsequently removed from the rubber mold, a large cast molded object having a beautiful surface free from cracks was obtained.

EXAMPLE 5

A 1mm thick fiber glass reinforced plastics molding material impregnated with an unsaturated polyester resin composed of poly(propylene maleate phthalate hexachloro-endomethylene-tetrahydrophthalate) to which approximately 30 percent of styrene and 5 percent of methyl methacrylate were added to make it into a liquid form, was placed between two sheets of sulfur vulcanized polybutadiene rubber. After the resin had been half cured with one second's irradiation using a 2 MeV electron beam accelerator at a dose rate of $8 \times 10^5$ rad/sec., this semi-cured material, inserted between the rubber sheets and shaped into a corrugated pattern, was cured by applying a further irradiation at the same dose rate for 7 seconds. When the rubber sheets were removed, a FRP corrugated panel having a glossy surface was obtained.

What is claimed is:

1. In a method of curing an unsaturated polyester resin obtained as reaction product of unsaturated acids selected from the group consisting of maleic, fumaric and itaconic acids or citraconic anhydrides with dihydric or polyhydric alcohols and derivatives thereof, wherein said polyester resin has a molecular weight in the range of 1,000 – 4,000 and is in direct contact with an elastomer selected from the group consisting of butadiene-styrene rubber, butyl rubber, nitrile rubber, chloroprene rubber, polybutadiene rubber, isoprene rubber, and ethylene-propylene terpolymer, said elastomer having been vulcanized with sulfur, the improvement which comprises irradiating said unsaturated polyester resin with ionizing radiation at a dose rate of $10^3 - 10^{11}$ rad. per hour at a temperature of from $-40°-120°C$.

2. The method, as claimed in claim 1, wherein the dose rate of ionizing radiation is in the range of from $10^5 - 10^{10}$ rad. per hour.

3. The method as claimed in claim 1 wherein said temperature is in the range of 0°– 50°C.

4. A method according to claim 1 wherein said ionizing radiation is selected from the group consisting of β-rays, γ-rays, accelerated electron beam, X-rays and neutron beam.

5. A method according to claim 1 wherein the processing pressure is within the range of 0 – 2 kg/cm$^2$G.

6. A method according to claim 1 wherein the processing pressure is within the range of 100 – 700 mmHg.

* * * * *